United States Patent
Guo et al.

(10) Patent No.: US 10,805,897 B2
(45) Date of Patent: *Oct. 13, 2020

(54) METHOD OF BEARER DELETION, DEVICE, AND SYSTEM

(71) Applicant: HUAWEI TECHNOLOGIES CO., LTD., Shenzhen, Guangdong (CN)

(72) Inventors: Xiaolong Guo, Beijing (CN); Lan Liu, Shenzhen (CN); Ming Li, Shenzhen (CN); Wanqiang Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,266

(22) Filed: Apr. 8, 2019

(65) Prior Publication Data

US 2019/0327703 A1    Oct. 24, 2019

Related U.S. Application Data

(63) Continuation of application No. 15/281,112, filed on Sep. 30, 2016, now Pat. No. 10,257,803, which is a (Continued)

(30) Foreign Application Priority Data

Jul. 25, 2007   (CN) .......................... 2007 1 0130053

(51) Int. Cl.
*H04W 76/32*   (2018.01)
*H04W 60/06*   (2009.01)
(Continued)

(52) U.S. Cl.
CPC ............. *H04W 60/06* (2013.01); *H04W 8/04* (2013.01); *H04W 76/32* (2018.02); *H04W 88/02* (2013.01); *H04W 88/16* (2013.01)

(58) Field of Classification Search
CPC ........ H04W 60/06; H04W 76/32; H04W 8/04
See application file for complete search history.

(56) References Cited

U.S. PATENT DOCUMENTS 8,041,361 B2   10/2011  Wu
8,520,593 B2   8/2013   Guo et al.
(Continued)

FOREIGN PATENT DOCUMENTS

CN    1874544 A    12/2006
CN    1960522 A    5/2007

OTHER PUBLICATIONS

3GPP TS 23.401 V1.0.0; 3rd Generation Partnership Project; Technical Specification Group Services and System Aspects; GPRS enhancements for E-UTRAN access(Release 8); May 2007; total 22 pages.

(Continued)

*Primary Examiner* — Fahmida S Chowdhury
(74) *Attorney, Agent, or Firm* — Huawei Technologies Co., Ltd.

(57) ABSTRACT

A method of bearer deletion is provided to improve the universality of the bearer deletion process. The method includes: receiving, by the original intermediate NE, the cancellation type indication parameter sent by the HSS, and deleting the bearer between the serving gateway (S-GW) and a packet data network gateway (P-GW), if the original intermediate network element obtains an attach type according to the cancellation type indication parameter indicating an attach type and a corresponding bearer exists on the original intermediate NE. This method helps efficiently improve the universality of the bearer deletion flow.

6 Claims, 8 Drawing Sheets

Related U.S. Application Data continuation of application No. 13/949,650, filed on Jul. 24, 2013, now Pat. No. 9,474,038, which is a continuation of application No. 12/691,068, filed on Jan. 21, 2010, now Pat. No. 8,520,593, which is a continuation of application No. PCT/CN2008/071755, filed on Jul. 25, 2008.

(51) Int. Cl.
  *H04W 8/04* (2009.01)
  *H04W 88/02* (2009.01)
  *H04W 88/16* (2009.01)

(56) References Cited

U.S. PATENT DOCUMENTS

| | | | |
|---|---|---|---|
| 9,474,038 B2 | 10/2016 | Guo et al. | |
| 2007/0033274 A1* | 2/2007 | Duan | H04L 12/14 709/223 |
| 2009/0043902 A1* | 2/2009 | Faccin | H04W 76/10 709/229 |
| 2010/0027541 A1* | 2/2010 | Eriksson | H04W 72/005 370/390 |

OTHER PUBLICATIONS

3GPP TS 23.060 V7.4.0; 3rd Generation Partnership Project;Technical Specification Group Services and System Aspects;General Packet Radio Service (GPRS);Service description;Stage 2(Release 7); Mar. 2007; total 216 pages.

FD.3.5; 3rd Generation Partnership Project;Technical Specification Group Services and System Aspects;3GPP System Architecture Evolution:Report on Technical Options and Conclusions(Release 7); total 184 pages.

3GPP TS 22.101 8.5.0 (Jun. 2007);3rd Generation Partnership Project;Technical Specification Group Services and SystemAspects Service aspects;Service principles(Release 8);total 47 pages.

* cited by examiner

METHOD OF BEARER DELETION, DEVICE, AND SYSTEM

CROSS-REFERENCE TO RELATED APPLICATIONS

This application is a continuation of U.S. patent application Ser. No. 15/281,112, filed on Sep. 30, 2016, which is a continuation of U.S. patent application Ser. No. 13/949,650, filed on Jul. 24, 2013, now U.S. Pat. No. 9,747,038. U.S. patent application Ser. No. 13/949,650 is a continuation of U.S. patent application Ser. No. 12/691,068, filed on Jan. 21, 2010, now U.S. Pat. No. 8,520,593. U.S. patent application Ser. No. 12/691,068 is a continuation of International Application No. PCT/CN2008/071755, filed on Jul. 25, 2008. The International Application claims the priority to Chinese patent application No. 200710130053.5, filed on Jul. 25, 2007. All of the afore-mentioned patent applications are hereby incorporated by reference in their entireties.

TECHNICAL FIELD

The present disclosure relates to the telecommunication field, and in particular, to a method of bearer deletion, home location register (HLR) and relevant device.

BACKGROUND

With the development of network technologies, new types of network structures emerge, such as the System Architecture Evolved (SAE). During the promotion of the SAE, the scenario in which an area is covered by both the SAE network and an existing network, such as a 2G or 3G network, occurs. As shown in FIG. 1, routing area (RA) 1 and RA 2 are covered by an existing 2G/3G network. A user equipment (UE) in the 2G/3G network needs to initiate a routing area update (RAU) request every time to change the RA. Tracking area (TA) 1 and TA 2 are tracking areas of the SAE network, similar to RAs in the 2G/3G network. TA 1 has intersected coverage with RA 1. In this case, when a multi-mode UE moves between these areas, the UE may frequently initiate network registration requests. For example, when the UE enters into RA 1, the UE registers with a serving GPRS support node (SGSN) of the 2G/3G network. When the UE enters into TA 1, the UE registers with a mobility management entity (MME) of the SAE network. When the UE moves from TA 1 to RA 1, the UE needs to register with the SGSN of the 2G/3G network again. Thus, significant air interface resources are wasted.

The bearer deletion method in the existing technologies applies to a single network. For example, after a UE performs the attach procedure in a 2G/3G network, if the SGSN is changed, the original attached SGSN receives the Cancel Location request from a home location register (HLR) and sends a Delete PDP Context Request message to a gateway GPRS support node (GGSN) to request for deleting the PDP context information when the UE exits upon exception last time. If no SGSN change occurs, the SGSN sends a Delete PDP Context Request message to the GGSN to request for deleting the PDP context information when the UE exits upon exception last time. That is, when the UE initiates an attach request or enters into a certain radio access technology (RAT) network by using the radio access technology for the first time and initiates an update location request, the accessed SGSN or MME needs to initiate a request to the serving gateway (S-GW) and PDN gateway (P-GW) to delete the original bearer if any. If no original bearer exists, the SGSN or MME initiates an update location request to the HSS. The HSS sends a cancel location request to the original SGSN or MME. If the original SGSN or MME has an original bearer, the SGSN or MME needs to initiate a request to the serving gateway (S-GW) and PDN gateway (P-GW) to delete the original bearer.

SUMMARY

Bearer deletion schemes as described above are not applicable across networks. To prevent duplicative UE registrations, the idle mode signaling reduction (ISR) rule is introduced to the existing technology. The core idea is as follows: A UE registers with a type of access network after the attach procedure. Then, the UE moves to another type of access network and registers with the access network. In this case, the UE can be registered with two types of access networks. When the UE moves between these two types of access networks, the UE does not initiate registration requests any more, thus conserving network resources.

A method of bearer deletion, a device, and a system are provided herein to improve the universality of the bearer deletion process.

A method of bearer deletion, a serving gateway, and a user device are provided herein to distinguish between the aforementioned scenarios and perform related processing to avoid problems due to incorrect deletion of the S-GW/P-GW bearer.

The bearer deletion method includes:

receiving, by an original intermediate network element (NE), a cancellation type indication parameter sent by a home subscriber server (HSS), and deleting a bearer between the original intermediate NE and the serving gateway (S-GW) and a bearer between the S-GW and the PDN gateway (P-GW) if the original intermediate Network Element obtains an attach type according to the cancellation type indication parameter indicative of an attach type and the existence of a bearer on the original intermediate NE.

An intermediate network element (NE) is provided in an embodiment of the present disclosure. The intermediate NE includes:

a receiving unit, configured to receive a Cancel Location message that contains the cancellation type indication parameter from the HSS; and a deletion unit, configured to delete a bearer between the intermediate NE and the S-GW and the bearer between the S-GW and the P-GW when the cancellation type indication parameter indicates an attach type and a corresponding bearers exists.

A further embodiment of an intermediate NE includes:

a receiving unit, configured to receive a context acknowledgement message or an explicit signaling sent by a new intermediate NE, and cancellation type indication parameter from a Home Subscriber Server (HSS); and a deletion unit, configured to delete a bearer between the intermediate NE and an S-GW if the context acknowledgement message or the explicit signaling contains an S-GW Change flag and a corresponding bearer exists on the intermediate NE.

DETAILED DESCRIPTION OF THE EMBODIMENTS

After ISR is activated, the following scenario may occur: If a UE with activated ISR moves from an SGSN to a new MME, the UE establishes a connection with the original S-GW, and maintains the ISR status. The new MME obtains the context information from the SGSN and the SGSN does not perform any action. The original MME receives the Cancel Location request from the HSS and deletes the UE context information from itself. Difficulty arises in distinguishing between the two actions of (a) receiving the Cancel Location request, that is, the action of initiating a procedure for deleting the bearers with the S-GW and P-GW when bearers exist, and (b) the action of deleting its own bearer. The SGSN connects to the S-GW. The S-GW connects to the P-GW. The bearer deletion schemes supported by the existing technologies are used to delete bearers inside a single network, but are not applicable across networks. As a result, the universality of the bearer deletion procedure is affected.

A method of bearer deletion, a device, and a system are provided herein to improve the universality of the bearer deletion process.

The method of bearer deletion provided herein is divided into two types:

Type I. Cancel Location procedure triggered inside the system

Type II. Cancel Location procedure triggered in two networks

Type I cancel location procedures can be further divided into the following five cases:

Case One: The UE registers with the Universal Mobile Telecommunication System (UMTS).

Figure 1:
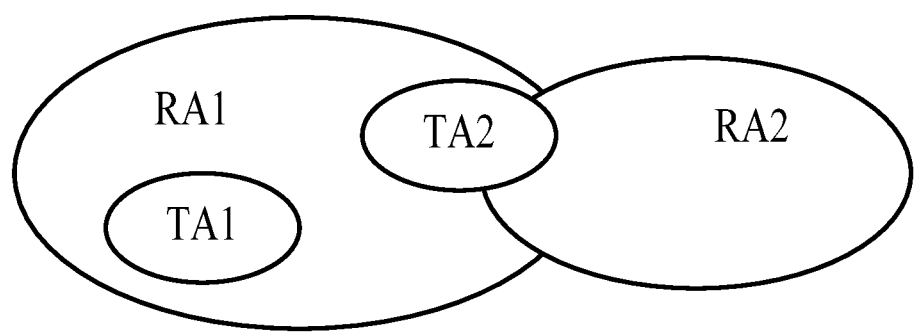
FIG. 1 shows an overlapped coverage of the networks that use the existing technologies.
Figure 2:
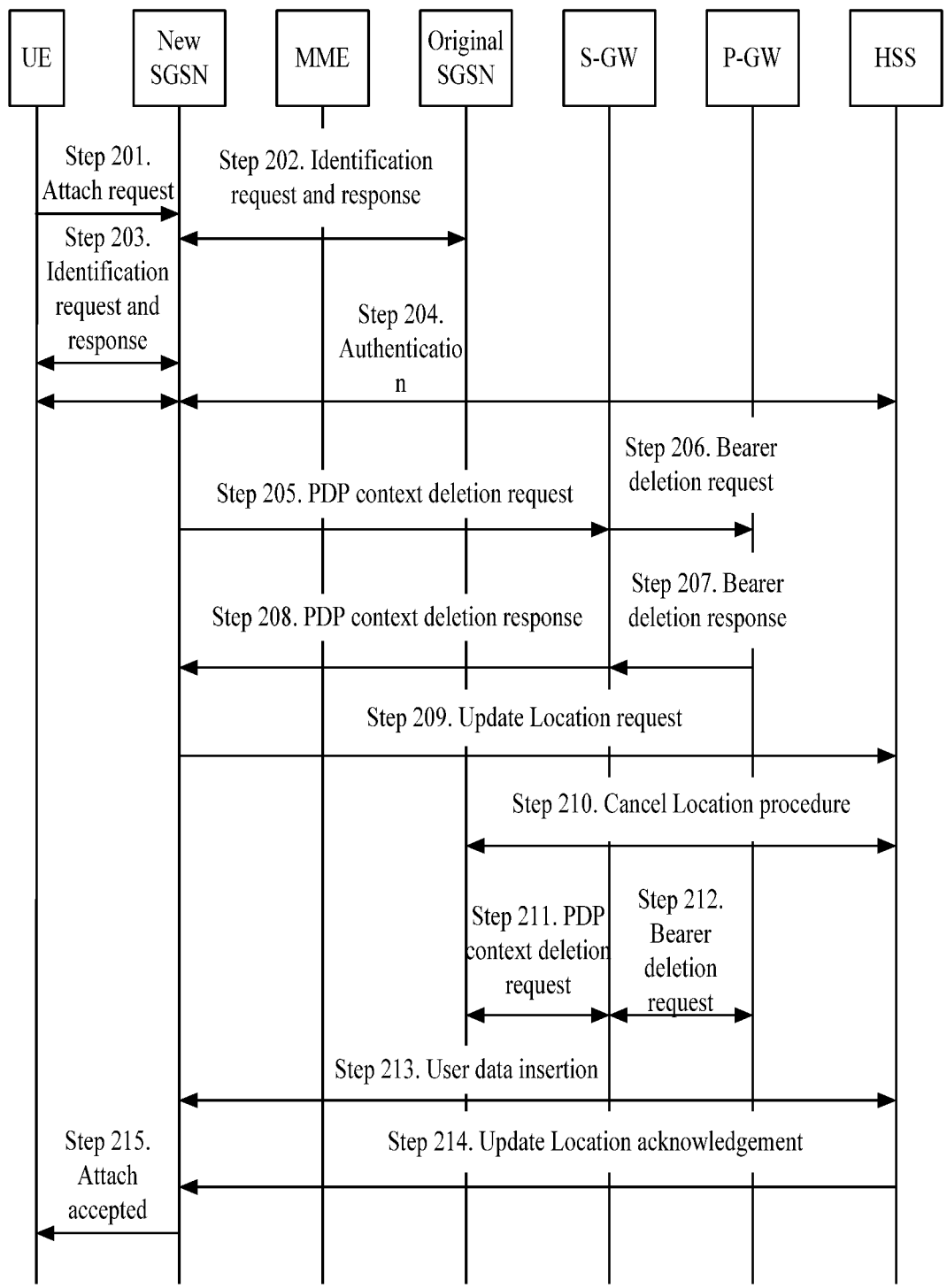
FIG. 2 shows a first case of the bearer deletion method according to an embodiment of the present disclosure.

FIG. 2 shows the first case of the bearer deletion method in an embodiment of the present disclosure, including:

Step 201: The UE sends an attach request.

The UE initiates an attach request to the new SGSN.

Step 202: The new SGSN interacts with the original SGSN to identify the UE.

If the new SGSN is not the SGSN originally registered by the UE, the new SGSN sends an identification request to the original SGSN to obtain the International Mobile Subscriber Identity (IMSI) of the UE.

Step 203: The new SGSN initiates an identification request to the UE to obtain the IMSI of the UE.

Step 204: The authentication procedure may be performed.

The UE performs authentication with the HSS through the new SGSN.

Step 205: The new SGSN initiates a PDP context deletion request or a bearer deletion request if the new SGSN is the SGSN originally registered by the UE and a bearer that is left due to last abnormal power-off of the UE exists. That is, the new SGSN sends a Delete PDP Context Request or a Delete Bearer Request message to the S-GW.

Step 206: The S-GW sends a bearer deletion request.

The S-GW sends a bearer deletion request to the P-GW.

Step 207: The P-GW sends a bearer deletion response to the S-GW.

Step 208: The S-GW sends a PDP context deletion response or a bearer deletion response to the new SGSN.

Step 209: If the new SGSN is not the SGSN originally registered by the UE, the new SGSN sends an Update Location request to the HSS.

Step 210: The original SGSN sends a Cancel Location request to the HSS.

Step 211: If the new SGSN is not the SGSN originally registered by the UE and a bearer that is left due to last abnormal power-off of the UE exists, the PDP context between the original SGSN and the S-GW is deleted.

Step 212: A request for deleting the bearer between the S-GW and the P-GW is sent.

Step 213: The HSS may insert the data about the UE to the new SGSN.

Step 214: The HSS sends an Update Location response to the new SGSN.

Step 215: The new SGSN sends a message that indicates attach accepted to the UE. The attach procedure is complete.

In the first case of the bearer deletion method, steps 205 to 208, step 211, and step 212 are the procedures for deleting an original bearer. If the SGSN that the UE last detached is the SGSN that the UE attaches this time, and original PDP Context information exists, steps 205 to 208 are performed and steps 209 to 214 are skipped.

If the SGSN that the UE last detached is not the SGSN that the UE attaches this time, and the original SGSN contains the original PDP Context information, steps 211 and 212 are performed and steps 205 to 208 are skipped.

After receiving the Delete PDP Context Request message, the S-GW triggers the procedure for deleting the bearer between the S-GW and the P-GW.

Case Two: The UE registers with the UMTS and then moves to the SAE.

Figure 3:
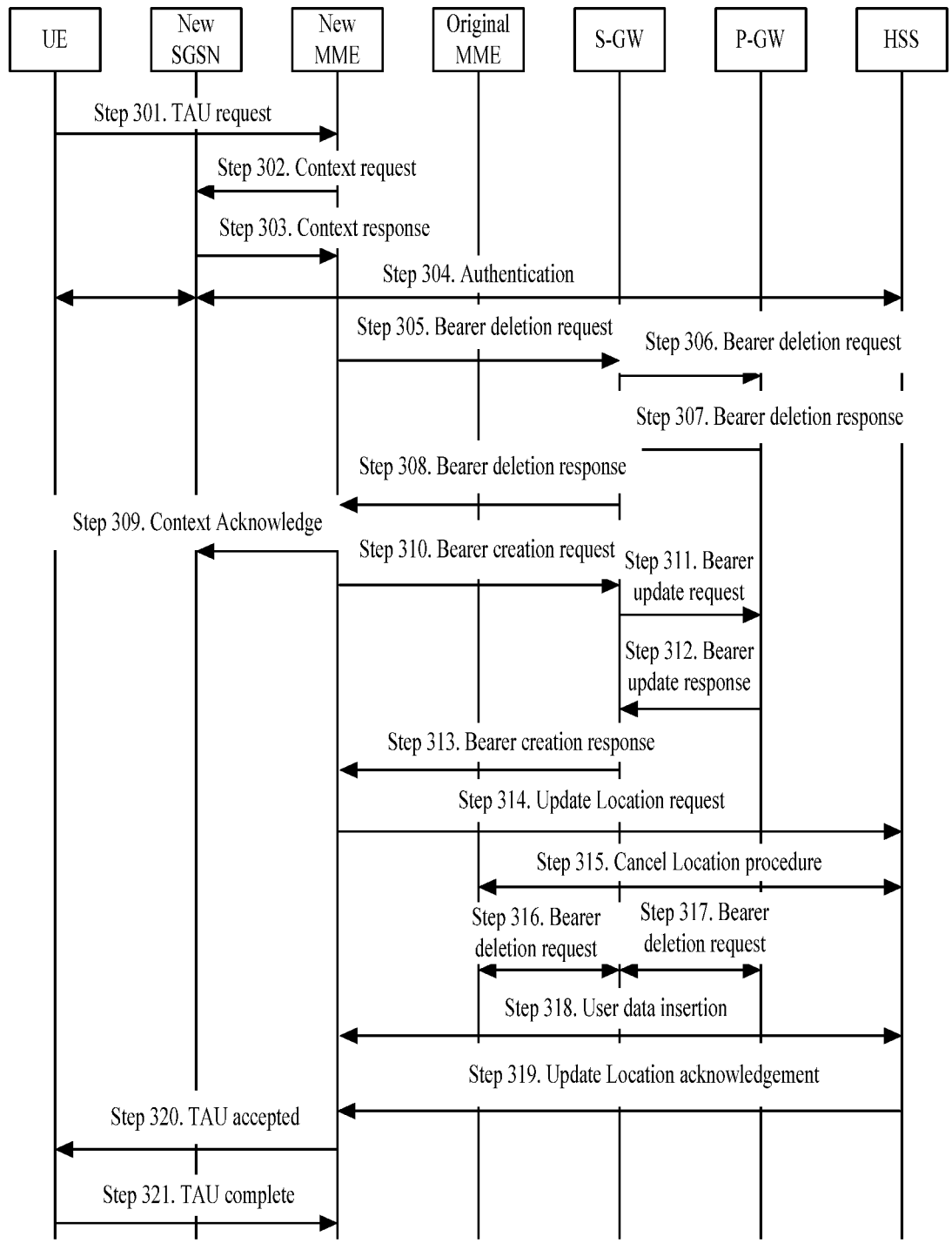
FIG. 3 shows a second case of the bearer deletion method according to an embodiment of the present disclosure.

FIG. 3 shows the second case of the bearer deletion method in an embodiment of the present disclosure, including:

Step 301: The UE sends an Area Update request.

The UE sends a TAU Request message to the new MME.

Step 302: The new MME sends a context request to the originally registered SGSN, that is, original SGSN.

Step 303: The original SGSN sends a context response to the new MME.

Step 304: The authentication procedure may be performed.

Step 305: If the new MME is the MME that the UE last detached or a bearer that is left due to last abnormal power-off of the UE exists, the new MME sends a bearer deletion request.

The new MME sends a bearer deletion request to the S-GW.

Step 306: The S-GW sends a bearer deletion request to the P-GW.

Step 307: The P-GW sends a bearer deletion response to the S-GW.

Step 308: The S-GW sends the bearer deletion response to the new MME.

Step 309: The new MME sends the Context acknowledgement message or explicit signaling to the SGSN.

Step 310: The new MME sends a request for creating a bearer to the S-GW to ensure that the bearers in the 2G and 3G networks are consistent.

Step 311: The S-GW sends a bearer update request to the P-GW.

Step 312: The P-GW sends a bearer update response to the S-GW.

Step 313: The S-GW sends the bearer setup response to the new MME.

Step 314: If the new MME is not the MME that the UE last detached, the new MME sends an Update Location request to the HSS.

Step 315: The original MME and the HSS perform the Cancel Location procedure.

Step 316: If the original MME finds a bearer that is left due to abnormal power-off of the UE, the original MME deletes the bearer.

Step 317: The bearer between the S-GW and the P-GW is deleted.

Step 318: The HSS may insert the data about the UE to the new MME.

Step 319: The HSS sends an Update Location response to the new MME.

Step 320: The new MME sends a message to the UE, indicating that the TAU request is accepted.

Step 321: If the Serving Temporary Mobile Station Identity (S-TMSI) is changed, the UE sends a message to the new MME, indicating that the TAU is complete.

In the second case of the bearer deletion method, when the ISR rule is activated, the UE initiates the TAU but not Attach procedure after entering into the SAE network. The new MME obtains the UE context information from the SGSN. If the new MME is the MME that the UE last detached, the new MME needs to delete the bearer that is left due to last abnormal power-off of the UE after obtaining the IMSI of the UE. Therefore, steps 205 to 208 are performed. The new MME sends a Delete Bearer Request message to the Tunnel Endpoint ID (IEID) of the GPRS Tunneling Protocol for Control Plane (GTP-C) allocated by the S-GW, requesting the S-GW to delete the bearer. The S-GW sends a bearer deletion request to the P-GW.

If the MME is changed, the Update Location procedure in the HSS is triggered. The HSS sends a Cancel Location request to the original MME. The UE enters into the SAE network for the first time. Therefore, to avoid any bearer that is left due to last abnormal power-off of the UE in the original MME, the original MME sends a request for deleting bearers between the MME and the S-GW and between the S-GW and the P-GW.

In the preceding procedure, the new MME receives the TAU request and obtains the context information from the SGSN. However, the new MME needs to delete the original context information because the UE registers with the SAE network for the first time. Normally, after receiving the TAU request, the new MME does not delete the context information. The possible causes for triggering the context deletion procedure are as follows:

A. The TAU request sent by the UE contains the registration flag. This flag indicates that the UE registers with the SAE network for the first time. The registration flag, such as attach flag, means that the UE attaches the SAE network.

B. The new MME obtains the context information from the SGSN and knows that a procedure similar to the Attach procedure is performed. If the SGSN has not established an ISR association with the MME, a flag can be carried. If the SGSN has established association with the original MME, the flag or other parameters are carried. If no such association is established, the flag or parameters are not carried. In this case, the new MME learns that the procedure is similar to the UE Attach procedure and the original bearer needs to be deleted.

The preceding is the processing flow for a UE that registers with a UMTS network and then moves to an SAE network. The processing flow for a UE that registers with an SAE network and then moves to a UMTS network is similar to the preceding flow.

The scenario in which the network entity is changed is described as follows:

Case Three: The UE switches from an SGSN to an MME when ISR is activated.

Figure 4:
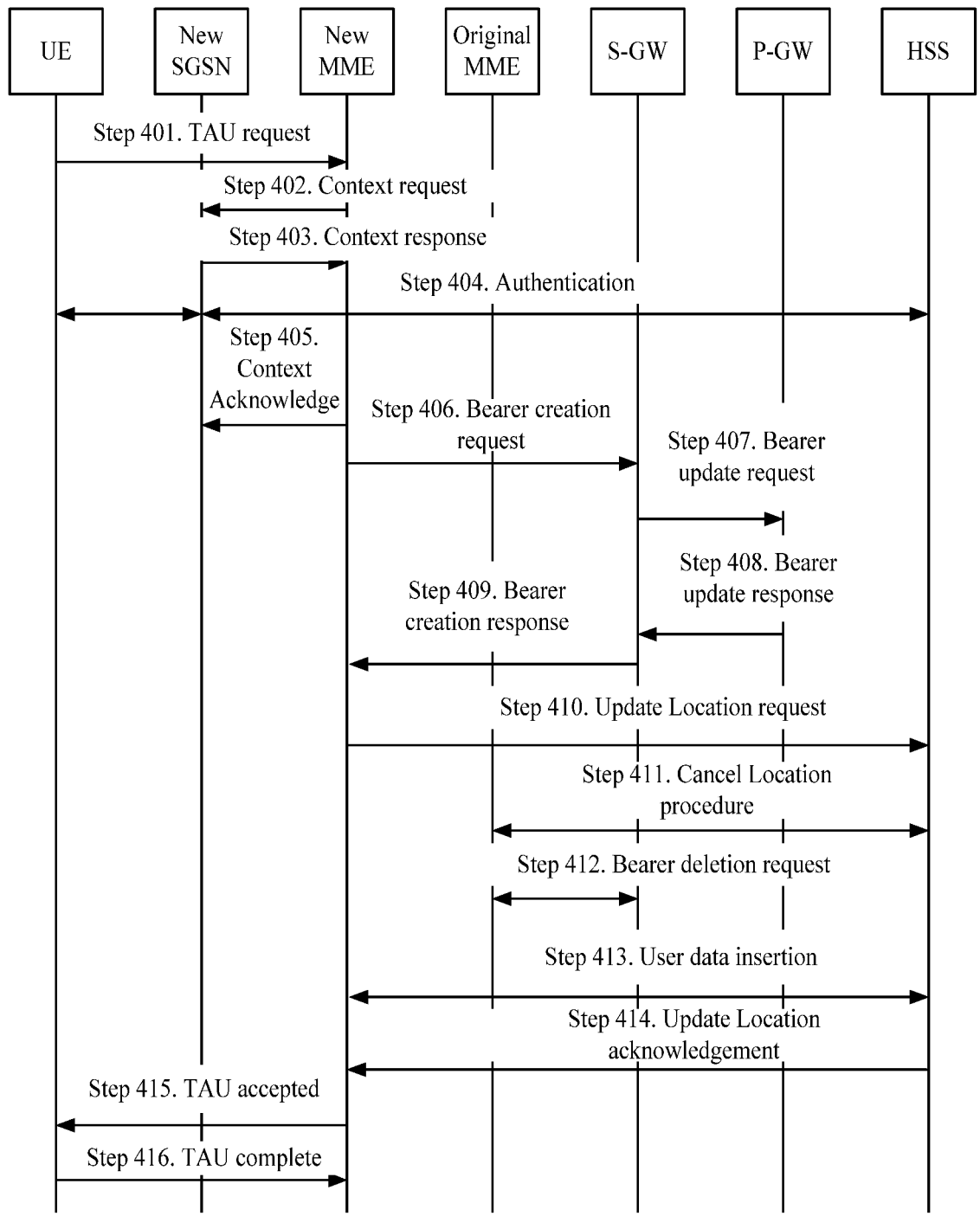
FIG. 4 shows a third case of the bearer deletion method according to an embodiment of the present disclosure.

FIG. 4 shows the third case of the bearer deletion method in an embodiment of the present disclosure, including:

Step 401: The UE sends a TAU request.

The UE sends a TAU Request message to the new MME.

Step 402: The new MME sends a context request to the SGSN.

Step 403: The original SGSN sends the context information to the new MME.

Step 404: The authentication procedure may be performed.

Step 405: The new MME sends the Context acknowledgement message or explicit signaling to the SGSN.

Step 406: A new bearer needs to be established because the MME is changed.

The new MME sends a bearer setup request to the S-GW.

Step 407: If the S-GW is changed, a bearer update request is sent.

The S-GW sends a bearer update request to the P-GW.

Step 408: The P-GW sends a bearer update response.

Step 409: The S-GW sends a bearer setup response.

Step 410: The new MME sends an Update Location request to the HSS.

Step 411: The original MME and the HSS perform the Cancel Location procedure.

Step 412: If the S-GW is changed, the original MME sends a request for deleting the bearer to the S-GW. If the S-GW is not changed, the original MME deletes the UE context information stored in the original MME.

Step 413: The HSS may insert the data about the UE to the new MME.

Step 414: The HSS sends an Update Location response to the new MME.

Step 415: The new MME sends a message to the UE, indicating that the TAU request is accepted.

Step 416: The UE sends a message to the new MME, indicating that the TAU is complete.

As shown in FIG. 3 and FIG. 4, the original MME receives the Cancel Location request from the HSS, and deletes the bearer with the P-GW or deletes the bearer with the S-GW or the context information on the MME depending on whether the S-GW is changed. Therefore, in the current mechanism, it is hard to differentiate bearer deletion operations. Several methods are provided herein to correctly differentiate bearer deletion operations.

Four bearer deletion methods (Methods A-D below) are described herein, including but not limited to:

Method A: After a UE accesses a certain system, the UE obtains the context information from the original intermediate NEs in all the systems accessed by the UE if ISR is activated.

For example, after the UE accesses a new MME, the new MME obtains the UE context information from the original MME and original SGSN. The original MME learns whether the UE accesses the new MME for the first time according to the Context acknowledgement message. In addition, the original MME learns the S-GW change information. Based on the preceding information, the original MME determines whether to initiate a request for deleting the bearer with the S-GW. If the S-GW is changed, the original MME deletes the bearer between the new MME and the original S-GW. If the S-GW is not changed, the original MME deletes the UE context information stored in the original MME. If the UE accesses the system for the first time, the original MME deletes the bearer between the new MME and the P-GW. If the UE accessed the system before, the bearer between the new MME and the P-GW does not need to be deleted. Or, if the UE accesses the system for the first time, the original MME does not initiate a context request to the new MME. Therefore, the original MME determines how to delete the bearer based on whether it receives the context request/acknowledgement and whether the S-GW Change flag is contained in the message. For example, in this instance, the original MME decides not to initiate a request for deleting the bearer with the P-GW based on the received Context Request and Context acknowledgement messages. However, if the S-GW is changed, the original MME initiates a request for deleting the bearer with the S-GW; otherwise, the original MME deletes the UE context information stored in the original MME.

That is, the new intermediate NE obtains the context information from the original intermediate NEs from the two systems and sends a Context acknowledgement message to the original intermediate NE in the system where the new intermediate NE is located. The message contains the Update/Attach flag and S-GW Change flag or similar information. The original intermediate NE in the same system decides how to delete the bearer based on this information. Attach means to delete the bearer to the P-GW after receiving the Cancel Location message. Or, if the Attach flag is contained in the message, the new intermediate NE does not obtain the context information from its own system. If the Update flag is contained, the new intermediate NE obtains the context information from the two systems. In this case, the original intermediate NE in the system where the new intermediate NE is located initiates a request for deleting the bearer with the P-GW after receiving the Cancel Location message from the HSS. Otherwise, if the Context Request or Context acknowledgement message is received, the new intermediate NE decides whether to delete the context information or the bearer with the S-GW based on the S-GW Change flag.

Example: In the common location update process, that is, when ISR is activated in the UE, the new intermediate NE sends a request for obtaining the context information from the original intermediate NEs in the two systems. The Context acknowledgement message sent by the new intermediate NE to the original intermediate NE in the same system contains the S-GW Change flag, indicating that the S-GW is changed. In this case, after receiving the Cancel Location request from the original intermediate NE, the new intermediate NE in the same system decides whether to initiate a request for deleting the bearer with the P-GW or with the S-GW or to delete the context information stored in itself based on whether the Context acknowledgement message and S-GW Change flag are received.

Method B: In the Update Location request, the Update Type flag is carried to indicate whether the Update Location procedure is or is similar to the Attach procedure (that is, the UE accesses the system for the first time after the detach procedure) or the Update Location procedure is an ordinary location update procedure. If it is an ordinary location update procedure, the S-GW Change flag needs to be carried.

The Cancel Location request sent by the HSS to the original entity (for example, the original MME) carries the same information, that is, Cancellation Type. The value of Cancellation Type equals the Update Type information. In this case, if the Cancellation Type indicates an attach type (it indicates that the UE accesses the network for the first time after the detach procedure), and related bearer exists in the original entity, a request for deleting the bearer with the S-GW and with the P-GW is initiated. For example, the original MME initiates a Delete Bearer request to the S-GW and the P-GW to delete the bearers that are left due to last abnormal power-off of the UE.

If the carried Cancellation Type is Update or RAU/TAU (it means that the UE accesses the network before), the S-GW Change flag is checked. If the S-GW Change flag is carried, that is, the S-GW is changed, the original entity initiates a request for deleting the bearer with the S-GW; otherwise, the original entity deletes the UE context information stored in the original entity.

In this example, if the original MME detects that the Cancellation Type in the Cancel Location message from the HSS is TAU, and the S-GW Change flag is carried, the original MME sends a Delete Bearer Request message with the S-GW Change flag to the S-GW. The S-GW receives the message and finds that the S-GW Change flag is contained. The S-GW does not send a request for deleting the bearer to the P-GW. If the original MME finds that the Cancellation Type in the Cancel Location message is TAU, and the S-GW Change flag is not carried, the original MME deletes the UE context information stored in the original MME but does not send a request to the S-GW for deleting the bearer. If the original MME finds that the Cancellation Type in the Cancel Location message indicates an attach type, and relevant bearer exists, the original MME sends a Delete Bearer Request message to the original S-GW to request for deleting the bearer with the S-GW. The S-GW does not receive the S-GW Change flag and thus sends a request for deleting the bearer with the P-GW.

Method C: The new entity sends a notification message to the original entity in the system. In this example, the ordinary TAU procedure is involved. Therefore, the new MME sends a Context Acknowledge or other message to the original MME before step 410 to inform the original MME whether the S-GW is changed. The original MME receives the message and learns that the ordinary TAU procedure is involved. If the UE accesses the SAE network for the first time, the new MME does not send such a message, or the message carries a parameter to indicate whether the ordinary TAU procedure or a procedure similar to Attach is involved. This message can carry the parameter that specifies the S-GW Change information. If the S-GW is changed, the original MME sends a request for deleting the bearer to the original S-GW but not the bearer with the P-GW. If the S-GW is not changed, the original MME deletes the UE context information stored in the original MME. Or, after the SGSN learns that the MME is changed, the SGSN establishes association with the new MME, and sends a message to the original MME to cancel the association with the original MME. In this case, the original MME learns that the UE initiates an ordinary TAU procedure. The Context acknowledgement message sent by the new MME to the SGSN specifies whether the S-GW is changed. Based on this information, the SGSN decides whether to carry the S-GW Change flag in the message sent to the original MME. Thus, the original MME decides whether to send a request for deleting the bearer with the S-GW or to delete the UE context information stored in the original MME.

Method D: After receiving a Cancel Location message from the HSS, the MME or SGSN sends a delete bearer request message to the S-GW if the MME or SGSN does not receive the context request or context acknowledge or receives an S-GW change flag. The S-GW decides whether to delete the bearer or to send a request for deleting the bearer with the P-GW. If the S-GW learns that ISR is not activated or is to be deactivated (for example, when the S-GW receives an ISR indication from another entity), or if the S-GW does not receive the S-GW Change flag in the delete bearer request message, the S-GW deletes its own bearer and initiates a request for deleting the bearer with the P-GW. If the S-GW learns that ISR is activated, and no S-GW Change flag is received, the S-GW returns a Delete Bearer Response message but does not delete its own bearer or send a request for deleting the bearer with the P-GW.

For method D, another bearer deletion method is provided herein in an embodiment of the present disclosure as follows: After the UE accesses an RAT network for the first time after the attach procedure, the UE initiates a location update request. This request contains a special flag, for example, the indication of the UE accessing the RAT network for the first time after the attach procedure. In this case, the accessed intermediate NE or new intermediate NE learns that the UE accesses this RAT network for the first time. If the new intermediate NE contains the UE bearer information, the new intermediate NE initiates a request for deleting the bearer between the NE and the S-GW and the bearer between the S-GW and the P-GW. If the new intermediate NE does not contain the UE bearer information, the intermediate NE initiates an Update Location request to the HSS, which contains the attach type flag.

A bearer deletion method is provided herein as follows: The original intermediate NE receives a Cancel Location request from the HSS and sends a bearer deletion request to the S-GW. If the S-GW learns that ISR is activated, the S-GW sends a bearer deletion response to the original intermediate NE but does not delete any bearer. If the S-GW learns that ISR is not activated or is to be deactivated, the S-GW sends a request for deleting the bearer between the S-GW and the P-GW and the bearer between the original intermediate NE and the S-GW.

In other words, if the ordinary location update procedure is involved, no request for deleting the bearer with the P-GW is sent. If the ordinary location update procedure is involved and the S-GW is changed, the intermediate NE, such as the SGSN and MME, sends a request for deleting the bearer with the S-GW but does not send a request for deleting the bearer between the S-GW and the P-GW. If the S-GW is not changed, the intermediate NE deletes the UE context information stored in the intermediate NE. If the Attach or Attach-like procedure is involved (that is, the location update procedure when the UE accesses a system for the first time after the detach procedure), the last detached intermediate NE of the system needs to delete the bearer with the S-GW and the bearer with the P-GW (if any) to avoid any bearer that is left due to abnormal power-off of the UE.

In this example, when the MME is changed, different methods can be used to implement the bearer deletion flow, thus improving the flexibility of bearer deletion.

The scenario inside the SGSN is described as follows:

Case Four: The UE switches from an MME to an SGSN when ISR is activated.

Figure 5:
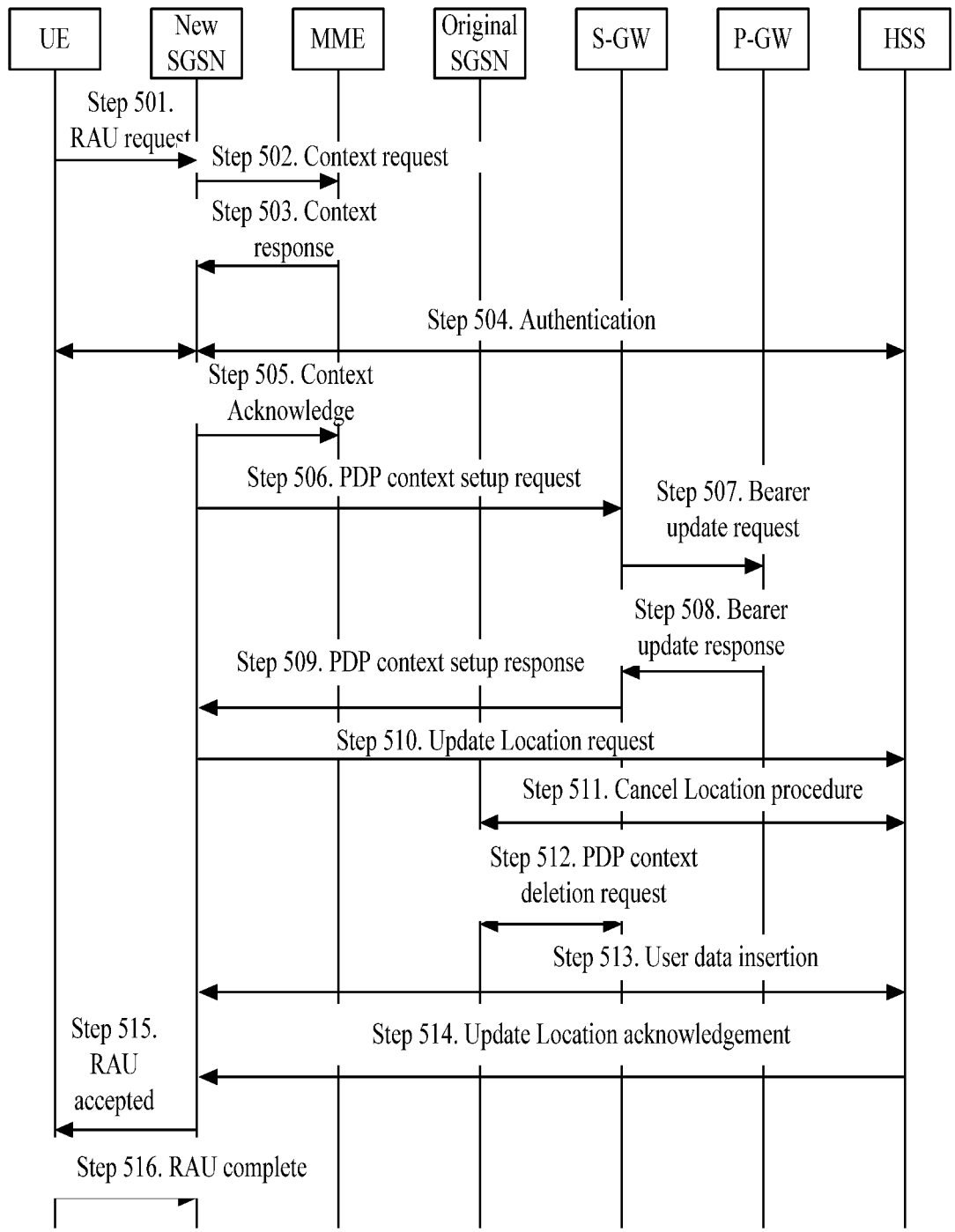
FIG. 5 shows a fourth case of the bearer deletion method according to an embodiment of the present disclosure.

FIG. 5 shows the fourth case of the bearer deletion method in an embodiment of the present disclosure, including:

Step 501: The UE sends an RAU request.

The UE sends an RAU Request message to the new SGSN.

Step 502: The new SGSN sends a context request to the MME.

Step 503: The MME sends the context information to the new SGSN.

Step 504: The authentication procedure may be performed.

Step 505: The new SGSN sends the Context acknowledgement message or explicit signaling to the MME.

Step 506: A request for creating PDP context or a request for creating a bearer is sent.

The new SGSN sends a request for creating PDP context or a request for creating a bearer to the S-GW.

Step 507: If the S-GW or related parameters are changed, the S-GW sends a bearer update request to the P-GW.

The S-GW sends a bearer update request to the P-GW.

Step 508: The P-GW sends a bearer update response.

Step 509: The PDP context setup response is sent.

Step 510: The new SGSN sends an Update Location request to the HSS.

Step 511: The original SGSN and the HSS perform the Cancel Location procedure.

Step 512: The PDP context request is deleted.

Step 513: The HSS may insert the data about the UE to the new SGSN.

514: The HSS sends an Update Location response to the new SGSN.

Step 515: The new SGSN sends a message to the UE, indicating that the RAU request is accepted.

Step 516: The UE sends a message to the new SGSN, indicating that the RAU is complete.

The bearer deletion methods are similar to the preceding description. When the S-GW is changed, the Delete PDP Context Request or Delete Bearer Request message needs to carry the S-GW Change flag. The following table describes the modification of the message if required.

| Information element | Presence requirement |
| --- | --- |
| Teardown Ind | Conditional |
| NSAPI | Mandatory |
| Protocol Configuration Options | Optional |
| Private Extension | Optional |
| S-GW Change | Conditional |

The new parameter is S-GW Change or a parameter that indicates the S-GW change information, for example, Cause. A certain cause value is used to indicate the S-GW change information. This cause value needs to be carried when the S-GW is changed.

Case Five: The UE switches from an SGSN to another SGSN when ISR is activated.

Figure 6:
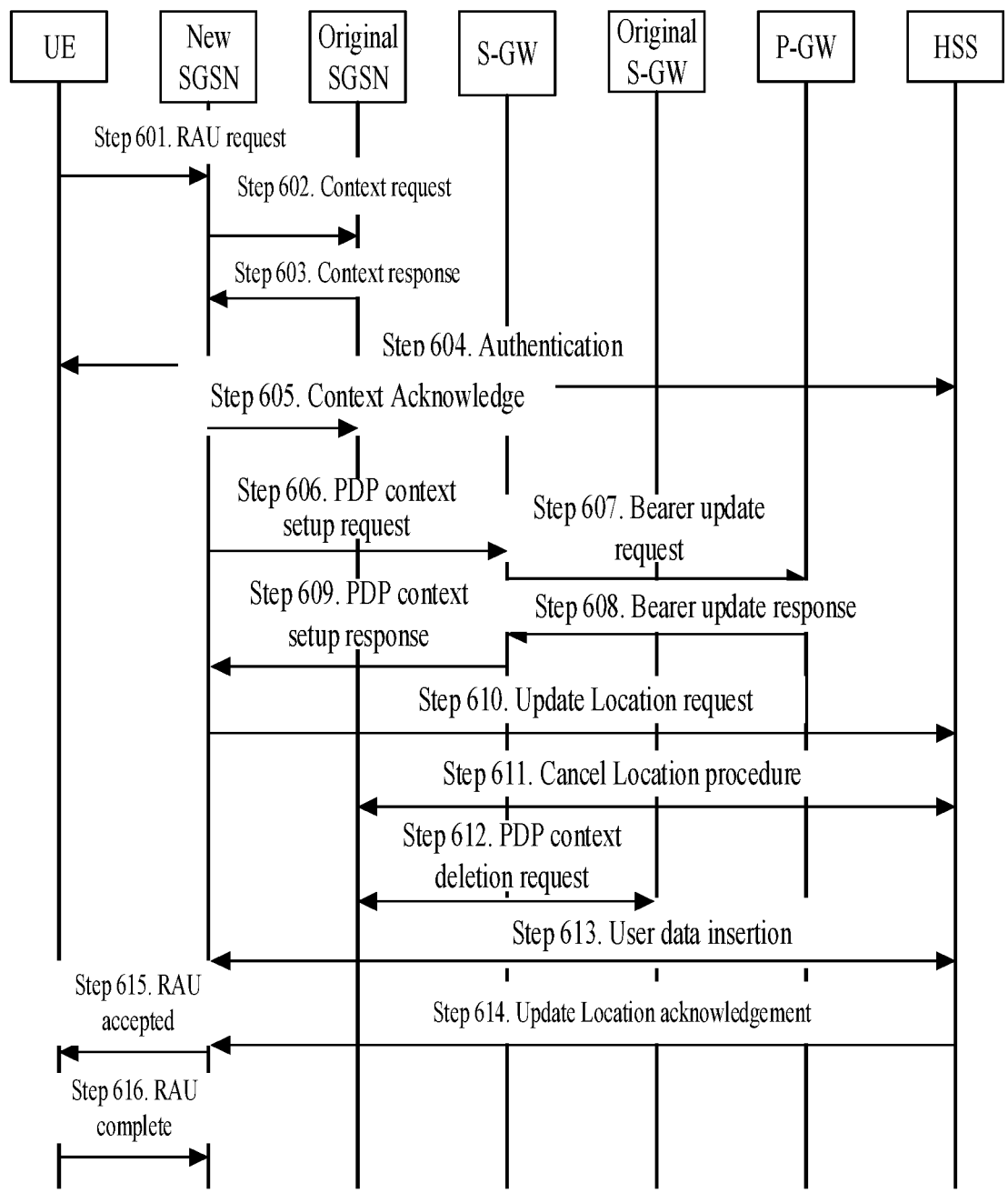
FIG. 6 shows a fifth case of the bearer deletion method according to an embodiment of the present disclosure.

FIG. 6 shows the fifth case of the bearer deletion method in an embodiment of the present disclosure, including:

Step 601: The UE sends an RAU request.

The UE sends an RAU Request message to the new SGSN.

Step 602: The new SGSN sends a context request to the original SGSN.

Step 603: The original SGSN sends the context information to the new SGSN.

Step 604: The authentication procedure may be performed.

Step 605: The new SGSN sends the Context acknowledgement message or explicit signaling to the original SGSN.

Step 606: The new SGSN sends a request for creating the PDP context.

The new SGSN sends a request for creating the PDP context to the S-GW.

Step 607: The S-GW sends a bearer update request.

The S-GW sends a bearer update request to the P-GW.

Step 608: The P-GW sends a bearer update response.

Step 609: The PDP context setup response is sent.

Step 610: The new SGSN sends an Update Location request to the HSS.

Step 611: The original SGSN and the HSS perform the Cancel Location procedure.

Step 612: The PDP context or bearer between the original SGSN and the original S-GW is deleted.

Step 613: The UE data is inserted between the new SGSN and the HSS.

Step 614: The HSS sends an Update Location response to the new SGSN.

Step 615: The new SGSN sends a message to the UE, indicating that the RAU request is accepted.

Step 616: The UE sends a message to the new SGSN, indicating that the RAU is complete.

The original SGSN can learn through the Context acknowledgement message that the ordinary TAU procedure is involved. However, if the S-GW is changed, the Context acknowledgement message needs to carry the S-GW Change information because the original SGSN needs to send a Delete PDP Context Request or Delete Bearer Request message to the S-GW to instruct the S-GW to delete the UE context information.

If the S-GW is not changed, the original SGSN only needs to delete the UE context information stored in the original SGSN.

If the S-GW receives a Delete PDP Context Request or Delete Bearer Request message from the SGSN, and the message does not carry the S-GW Change flag, the S-GW regards that the UE initiates an Attach procedure, and then the S-GW sends a Delete Bearer message to the P-GW.

Therefore, the Context acknowledgement message between the existing SGSNs needs to be modified, as shown in the following table.

| Information element | Presence requirement |
| --- | --- |
| Cause | Mandatory |
| Tunnel Endpoint Identifier Data II | Conditional |
| SGSN Address for user traffic | Conditional |
| Private Extension | Optional |
| S-GW Change | Conditional |

The S-GW Change flag or a parameter that indicates the S-GW change information, for example, Cause, needs to be included in this message. A certain cause value is used to indicate the S-GW change information. This cause value needs to be carried when the S-GW is changed.

It can be inferred that the scenario in which the UE switches from an MME to another MME when ISR is activated is the same as this scenario.

Type II. Cancel Location Procedure Triggered in Two Networks

Figure 7:
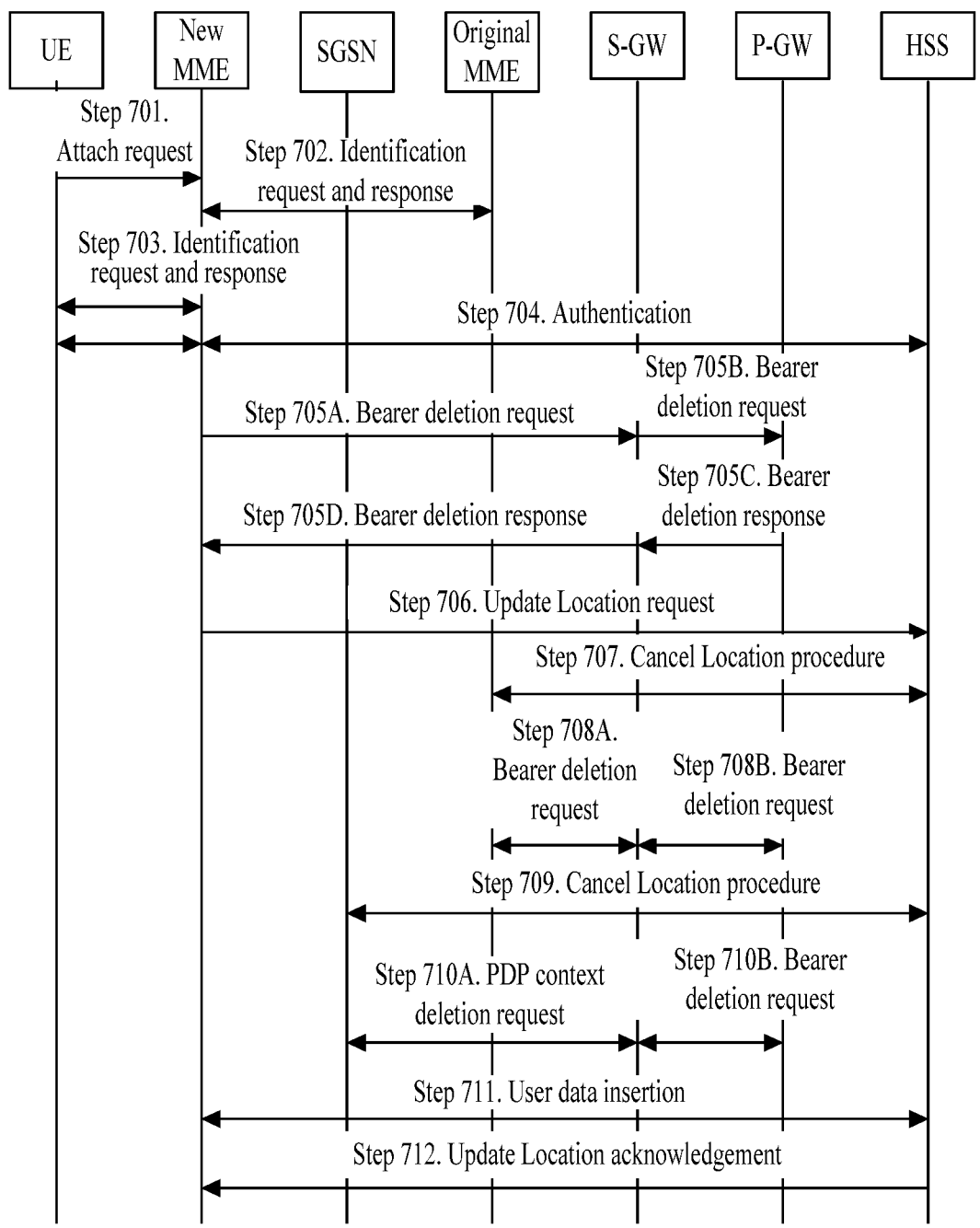
FIG. 7 shows a sixth case of the bearer deletion method according to an embodiment of the present disclosure.

Case Six: FIG. 7 shows the sixth case of the bearer deletion method in an embodiment of the present disclosure, including:

Step 701: The UE sends an attach request.

The UE initiates an attach request to the new MME.

Step 702: The UE identification is performed (including request and response messages).

The new MME sends an identification request to the original MME to obtain the IMSI of the UE.

Step 703: The new MME exchanges messages (including request and response) with the UE. If the IMSI of the UE is not obtained, the new MME obtains the IMSI from the UE.

Step 704: The authentication procedure may be performed.

The UE performs authentication with the new MME and the HSS.

Steps 705A to 705D. If the entity that the UE last detached is the entity accessed this time, the bearer deletion request and response messages are sent to delete the bearer left due to abnormal power-off of the UE.

Step 706: The Update Location request is sent.

The new MME sends an Update Location request to the HSS.

Step 707: The original MME and the HSS perform the Cancel Location procedure.

Steps 708A to 708B. A bearer deletion request is sent.

Step 709: The SGSN and the HSS perform the Cancel Location procedure.

Steps 710A to 710B. The PDP context or bearer is deleted.

Step 711: The UE data is inserted between the new MME and the HSS.

Step 712: The HSS sends an Update Location response to the new MME.

In this example, after registering with the new MME, the UE sends an Update Location request to the HSS. The HSS sends Cancel Location requests to the original MME and the original SGSN to delete the UE context information. If the MME is not changed but the UE context information is reserved, the MME does not send an Update Location request to the HSS. As a result, the UE context information on the SGSN cannot be deleted. Therefore, if the UE initiates the Attach procedure, the UE can force the MME to initiate an Update Location request to the HSS even if the MME is not changed.

If the HSS finds that the saved MME is the MME that sends the Update Location request, it indicates that the UE does not change the MME and thus does not need to send a Cancel Location request to the MME that stores the UE context information. However, the UE sends a Cancel Location request to the SGSN that stores the UE context information. After receiving the request, the SGSN deletes the bearer with the P-GW.

To distinguish between Update Location requests of the ordinary RAU and TAU, the Update Location requests needs to carry the attach flag, the RAU/TAU flag, or a flag that indicates whether the value of Update Type indicates an attach type or Update. The value of Cancellation Type is the same as that of Update Type. If the S-GW is changed, the S-GW Change flag may be required.

After the UE is attached to the SAE network, the HSS has sent a Cancel Location request to the original SGSN. Therefore, the next time when the UE accesses the SGSN, the HSS does not send the Cancel Location request to the original SGSN or perform bearer deletion. Even if the UE does not change the SGSN, the SGSN initiates an Update Location request to the HSS because no UE context information exists in the SGSN.

The UE sends the Attach Request message for once. The UE sends an RAU or TAU request after accessing another RAT network for the first time after the Attach procedure. When the preceding method is used, that is, deleting the UE context information from all the entities registered by the UE last time during the attach procedure, it is not necessary to judge whether the UE accesses the RAT network for the first time after power-on. After the RAU or TAU request is received, the Attach flag needs to be marked in the Update Location message. In this case, the original entity deletes the bearer of the UE.

The preceding example describes the scenario when the UE is attached to an SAE network. The principles for the scenario when the UE is attached to a 2G or 3G network are the same as those for the preceding scenario. When the UE sends an Attach Request message to a certain intermediate NE, the intermediate NE sends an Update Location request (with Update Type as Attach) to the HSS. The HSS sends a Cancel Location message to the original intermediate NEs (those in the 2G/3G network and SAE network) to delete the UE context information and bearer left by the UE. In this case, the UE does not need to identify the procedure when accessing another system.

Figure 8:
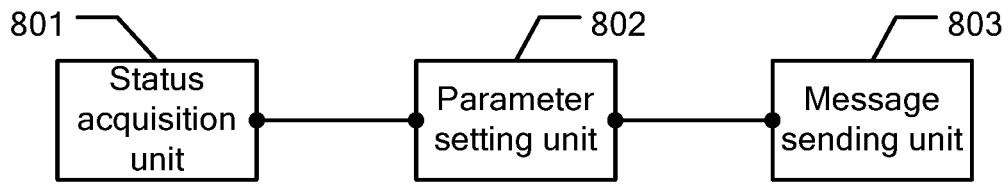
FIG. 8 shows a first case of the intermediate NE according to an embodiment of the present disclosure.

A fixture is provided herein. See FIG. 8: The first case of intermediate NE in the present disclosure includes:

a status obtaining unit 801, configured to obtain the network status of the UE;

a parameter setting unit 802, configured to: judge whether the UE performs the attach procedure or accesses the network for the first time based on the obtained UE network status, and set the update type flag to Attach if the UE performs the attach procedure or accesses the network for the first time based on the obtained UE network status, or set the update type flag to Update if not; and a message sending unit 803, configured to send the Update Location message that contains the update type flag to the HSS.

Figure 9:
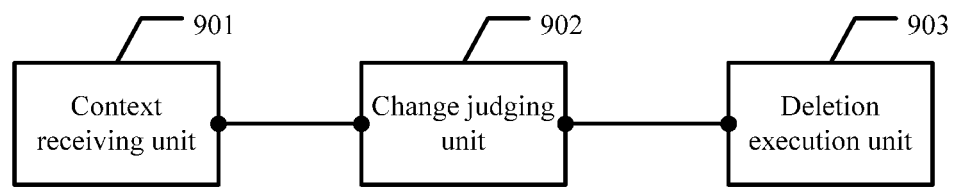
FIG. 9 shows a second case of the intermediate NE according to an embodiment of the present disclosure.

FIG. 9 shows the second case of the intermediate NE in an embodiment of the present disclosure, including:

a context receiving unit 901, configured to receive Context Request, Context Acknowledge, Cancel Location or other explicit messages;

a change judging unit 902, configured to judge whether the Context Request, Context Acknowledge, Cancel Location or other explicit message contains the Attach, Location Update, or S-GW Change flag; and a deletion execution unit 903, configured to: initiate a request for deleting the bearer with the S-GW and the bearer between the S-GW and the P-GW when the Context Request, Context Acknowledge, Cancel Location or other explicit message contains the Attach flag; initiate a request for deleting the bearer with the S-GW if the message contains the Update flag and the S-GW Change flag; delete the UE context information if the S-GW Change flag is not contained.

Figure 10:
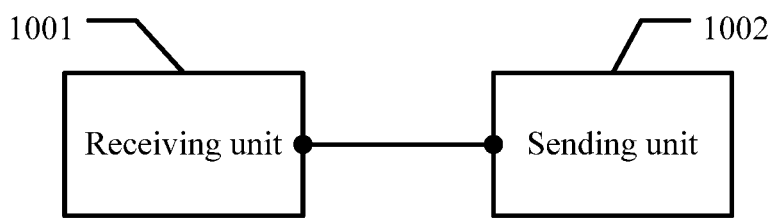
FIG. 10 shows an HSS according to an embodiment of the present disclosure.

FIG. 10 shows the HSS in an embodiment of the present disclosure, including:

a receiving unit 1001, configured to receive Update Location messages sent by the intermediate NE; and a sending unit 1002, configured to send Cancel Location messages to the intermediate NE.

The cancellation type indication parameter in the Cancel Location message is the update type flag in the Update Location message received by the receiving unit. If the Update Location message received by the receiving unit carries the S-GW Change flag, the Cancel Location message sent by the sending unit carries the S-GW Change flag.

Figure 11:
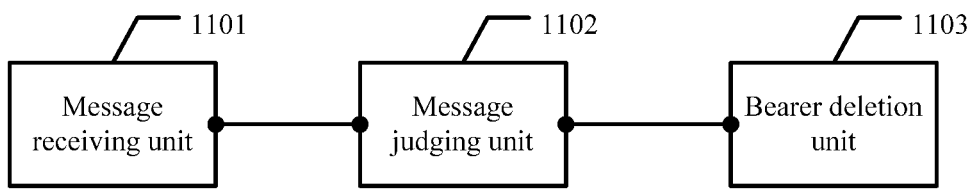
FIG. 11 shows an S-GW according to an embodiment of the present disclosure.

FIG. 11 shows the S-GW in an embodiment of the present disclosure, including:

a message receiving unit 1101, configured to receive the request for deleting a bearer or the request for deleting a PDP context from the intermediate NE;

a message judging unit 1102, configured to judge whether the bearer deletion request or PDP context deletion request contains a request for deleting the bearer with the P-GW (if the S-GW Change flag is carried, it indicates that the bearer with the P-GW does not need to be deleted; otherwise, the bearer with the P-GW needs to be deleted); and a bearer deletion unit 1103, configured to: initiate a request for deleting the bearer with the P-GW if the said bearer deletion request or the request for deleting a packet data protocol context contains the indication for deleting the information about the bearer with the P-GW and the relevant bearer exists; otherwise, delete the context information about the UE.

An intermediate NE is provided in an embodiment of the present disclosure. The intermediate NE includes:

a receiving unit, configured to receive the Cancel Location message that contains the cancellation type indication parameter sent by the HSS; and a deletion unit, configured to delete the bearer with the S-GW and the bearer between the S-GW and the P-GW when the cancellation type indication parameter indicates an attach type and relevant bearer exists.

The intermediate NE can be integrated into an MME or an SGSN.

An intermediate NE is provided in an embodiment of the present disclosure. The intermediate NE includes:

a receiving unit, configured to receive the Cancel Location message that contains the cancellation type indication parameter sent by the HSS; and a deletion unit, configured to delete the bearer between the intermediate NE and the S-GW when the cancellation type indication parameter is Update and the S-GW Change flag is received.

The deletion unit is also configured to delete the UE context information stored in the intermediate NE if the cancellation type indication parameter is Update and the S-GW Change flag is not received or an S-GW Not Changed flag is received.

The intermediate NE can be integrated into an MME or an SGSN.

A bearer control system is provided in an embodiment of the present disclosure. The bearer control system includes:

a new intermediate NE, configured to indicate the update type flag in the Update Location message that is sent to the HSS as Attach when the UE accesses the network for the first time;

an HSS, configured to send the Cancel Location message that contains the cancellation type indication parameter to the original intermediate NE when receiving the Update Location message from the new intermediate NE, in which the cancellation type indication parameter indicates an attach type; and an original intermediate NE, configured to: receive the Cancel Location message that contains the cancellation type indication parameter sent from the HSS, and delete the bearer between the original intermediate NE and the S-GW and the bearer between the S-GW and the P-GW when the cancellation type indication parameter indicates an attach type and relevant bearers exist.

Alternatively, the bearer control system includes:

a new intermediate NE, configured to indicate the update type flag in the Update Location message that is sent to the HSS as Update when the UE accesses the network for the first time;

an HSS, configured to send the Cancel Location message that contains the cancellation type indication parameter to the original intermediate NE when receiving the Update Location message from the new intermediate NE, in which the cancellation type indication parameter is Update; and an original intermediate NE, configured to: receive the Cancel Location message that contains the cancellation type indication parameter from the HSS, and delete the bearer between the original intermediate NE and the original S-GW if the S-GW Change flag is received or delete the UE context information stored in the original intermediate NE if the S-GW Change flag is not received or an S-GW Not Changed flag is received when the original intermediate NE determines that the cancellation type indication parameter is Update.

An intermediate NE is provided in an embodiment of the present disclosure, including:

a receiving unit, configured to receive Context acknowledgement message or explicit signaling sent by the new intermediate NE; and a deletion unit, configured to delete the bearer between the intermediate NE and the S-GW when the preceding message or explicit signaling contains the S-GW Change flag and the bearer exists.

The deletion unit is also configured to delete the UE context information stored in the intermediate NE.

Before receiving the Context acknowledgement message or explicit signaling from the new intermediate NE, the receiving unit is configured to receive the Context Request message sent by the new intermediate NE.

The intermediate NE further includes a sending unit that is configured to send the context response to the new intermediate NE.

The deletion unit is also configured to delete the PDP context or bearer information stored locally.

An HSS is provided in an embodiment of the present disclosure, including:

a receiving unit, configured to receive the Update Location request sent by the new intermediate NE after the UE initiates an attach request; and a sending unit, configured to: send the Cancel Location requests to the original intermediate NE and the original intermediate NE in the other system registered by the UE, and instruct the two original intermediate NEs to delete the bearer with the S-GW and the bearer between the S-GW and the P-GW when the intermediate NE originally registered by the UE is changed.

An intermediate NE is provided in an embodiment of the present disclosure, including:

an acquisition unit, configured to obtain the context information from the original intermediate NE in the own system and the original intermediate NE in the system registered by the UE; and a feedback unit, configured to send the acknowledgement message that contains the cancellation type indication parameter to the two original intermediate NEs.

Another intermediate NE is provided in an embodiment of the present disclosure, including:

a sending unit, configured to send the UE context information to the new intermediate NE;

a receiving unit, configured to receive the acknowledgement message that contains the cancellation type indication parameter sent by the new intermediate NE;

a first deletion unit, configured to delete the bearer between the original intermediate NE and the P-GW when the cancellation type indication parameter indicates an attach type; and a second deletion unit, configured to: delete the bearer between the original intermediate NE and the original S-GW when the cancellation type indication parameter is Update and the S-GW Change flag is received, or delete the UE context information stored in the local intermediate NE when the S-GW Change flag is not received.

An S-GW is provided in an embodiment of the present disclosure. The S-GW includes:

a message receiving unit, configured to receive the request for deleting a bearer or the request for deleting a packet data protocol context from the original intermediate NE;

a message judging unit, configured to: determine whether to restrict ISR activation, and send a bearer deletion response to the original intermediate NE without deleting the bearer if the ISR is activated and the S-GW is not changed; or send a request for deleting the bearer with the P-G and delete the bearer when the ISR is deactivated and the S-GW is not changed.

An intermediate NE is provided in an embodiment of the present disclosure. The intermediate NE includes:

a location update receiving unit, configured to receive the Update Location request that contains the flag of the first access to the RAT network after attach from the UE;

a deletion unit, configured to initiate the procedure for deleting the bearer between the intermediate NE and the S-GW and the bearer between the S-GW and the P-GW when the bearer information about the UE exists in the intermediate NE; and a location update initiating unit, configured to initiate an Update Location request that contains the attach type flag to the HSS when no bearer information about the UE exists in the intermediate NE.

From the preceding technical scheme, the present disclosure has the following advantages:

The intermediate NE receives the cancel location message that contains the cancellation type indication parameter sent by the HSS, determines whether the procedure is an update procedure or an attach procedure based on the cancellation type indication parameter, and decides how to delete bearers. For example, if the cancellation type indication parameter indicates an attach type, and bearers exist, the intermediate NE deletes the bearer between the intermediate NE and the S-GW and the bearer between the S-GW and the P-GW. Or, the S-GW judges whether to delete its own bearer and the bearer with the P-GW. The preceding method helps distinguish between the following procedures: the procedure for deleting abnormal bearers when the UE accesses the RAT network for the first time after the attach procedure; the procedure for deleting or reserving bearers in other scenarios.

A UE is provided in an embodiment of the present disclosure, including a sending unit, configured to send an Update Location request when the UE accesses an RAT network for the first time after the attach procedure. The Update Location request carries the attach flag, indicating that the UE accesses the RAT network for the first time after the attach procedure.

For the functions and implementation processes of the units of the preceding equipment, see the implementation flow of the related method.

In the present disclosure, the attach flag, update flag, and S-GW Change flag are used to indicate whether a UE accesses a certain network for the first time after the attach or detach procedure, the UE accessed a certain network before, and the S-GW of the UE is changed. Other methods can be used to indicate this information. For example, certain cause values can be adapted. The present disclosure provides an option but does not confine the method for illustrating such difference.

Those skilled in the art can complete all or part of the steps in the preceding method by using a program to instruct related hardware. The program can be stored in a storage medium that can be read by a computer. The procedure for executing the program is as follows: The original intermediate NE receives the cancellation type indication parameter sent by the HSS. If the cancellation type indication parameter indicates an attach type, and the original intermediate NE contains relevant bearers, the original intermediate NE deletes the bearer between the original intermediate NE and the S-GW and the bearer between the S-GW and the P-GW.

The preceding storage medium can be a read-only storage, a disk, a compact disk (CD), or other suitable storage medium (magnetic (volatile and non-volatile), optical, etc.).

Detailed above are a bearer deletion method, an intermediate NE, an S-GW, an HSS, and a bearer control system in an embodiment of the present disclosure. It is apparent that those skilled in the art can make various modifications and variations to the disclosure without departing from the spirit and scope of the disclosure. The disclosure is intended to cover the modifications and variations provided that they fall in the scope of protection defined by the following claims or their equivalents.

What is claimed is:

1. A method for managing bearer resources when a terminal device changes its attachment from a first intermediate network element to a second intermediate network element, comprising:
    sending, by the second intermediate network element to a home subscriber server (HSS), an update location message, wherein the update location message carries an update type flag, the update type flag indicates whether the terminal device is performing an attach procedure or a location update procedure;
    sending, by the HSS to the first intermediate network element, a cancel location message, wherein the cancel location message contains an indicator indicating a cancellation type;
    when the cancellation type is an attach type, and a bearer corresponding to the terminal device exists on the first intermediate network element, sending, by the first intermediate network element to a serving gateway, a first request for deleting the bearer, and sending, by the serving gateway to a packet data network gateway, a second request for deleting the bearer after receiving the first request; or
    when the cancellation type is an update type, a bearer corresponding to the terminal device exists on the first intermediate network element, and a serving gateway change indication is received by the first intermediate network element, sending, by the first intermediate network element to the serving gateway, a third request for deleting the bearer; or
    when the cancellation type is the update type, and the serving gateway change indication is not received by the first intermediate network element, deleting, by the first intermediate network element, context information corresponding to the terminal device stored in the first intermediate network element.

2. The method according to claim 1, wherein the first intermediate network element is a mobility management entity or a serving general packet radio service support node.

3. The method according to claim 1, wherein the second intermediate network element is a mobility management entity or a serving general packet radio service support node.

4. A network system, comprising a first intermediate network device, a second intermediate network device, a home subscriber server (HSS) and a serving gateway, wherein when a terminal device changes its attachment from the first intermediate network device to the second intermediate network device,
    the second intermediate network device is configured to send an update location message to the HSS, wherein the update location message carries an update type flag, and the update type flag indicates whether the terminal device is performing an attach procedure or a location update procedure;
    the HSS is configured to send a cancel location message to the first intermediate network device, wherein the cancel location message contains an indicator indicating a cancellation type; and
    the first intermediate network device is configured to:
    when the cancellation type is an attach type, and a bearer corresponding to the terminal device exists on the first intermediate network device, send a first request to the serving gateway for deleting the bearer, wherein the serving gateway sends a second request for deleting the bearer to a packet data network gateway after receiving the first request; or
    when the cancellation type is an update type, a bearer corresponding to the terminal device exists on the first intermediate network device, and when a serving gateway change indication is received by the first intermediate network device, send a third request for deleting the bearer to the serving gateway; or
    when the cancellation type is the update type, and the serving gateway change indication is not received by the first intermediate network device, delete context information corresponding to the terminal device stored in the first intermediate network device.

5. The network system according to claim 4, wherein the first intermediate network device is a mobility management entity or a serving general packet radio service support node.

6. The network system according to claim 4, wherein the second intermediate network device is a mobility management entity or a serving general packet radio service support node.

* * * * *